US006443676B1

(12) United States Patent
Kopras

(10) Patent No.: US 6,443,676 B1
(45) Date of Patent: Sep. 3, 2002

(54) AUTOMATIC LOCKING DEPTH GUIDE FOR CUTTING TOOLS AND THE LIKE

(75) Inventor: Robert K. Kopras, Black Earth, WI (US)

(73) Assignee: Roto Zip Tool Corporation, Cross Plains, WI (US)

( * ) Notice: Subject to any disclaimer, the term of this patent is extended or adjusted under 35 U.S.C. 154(b) by 0 days.

(21) Appl. No.: 09/613,889

(22) Filed: Jul. 11, 2000

(51) Int. Cl.[7] .................................................. B23C 1/20

(52) U.S. Cl. ............... 409/182; 144/136.95; 144/154.5; 408/112; 408/241 S; 409/206

(58) Field of Search ........................... 408/14, 110, 111, 408/112, 113, 241 S; 409/175, 181, 182, 204, 206, 210, 214, 218; 144/154.5, 136.95

(56) References Cited

U.S. PATENT DOCUMENTS 1,565,790 A 12/1925 Carter
1,581,719 A * 4/1926 Carter ........................ 409/182
1,584,078 A * 5/1926 Carter ........................ 409/182
1,904,109 A 4/1933 Wendorf
3,550,481 A * 12/1970 Jensen ........................ 408/112
3,633,682 A 1/1972 Moores, Jr.
3,746,460 A * 7/1973 Lipe ........................... 408/112
3,791,260 A 2/1974 Ambler et al.
4,273,483 A 6/1981 Mendicino
4,562,872 A * 1/1986 Fushiya et al. .......... 408/241 S
4,572,715 A * 2/1986 Wolff ......................... 408/112
4,770,573 A * 9/1988 Monobe ..................... 409/182
4,938,642 A 7/1990 Imahashi et al.
5,143,490 A 9/1992 Kopras
5,143,494 A * 9/1992 McCurry .................... 409/182
5,310,296 A * 5/1994 McCurry .................... 409/182
5,323,823 A 6/1994 Kopras
5,671,789 A * 9/1997 Stolzer et al. .............. 409/182
5,813,805 A 9/1998 Kopras
5,902,080 A 5/1999 Kopras
6,048,260 A 4/2000 Kopras
D439,122 S 3/2001 Adler et al.
D439,484 S 3/2001 Adler et al.

FOREIGN PATENT DOCUMENTS

DE 27 05 410 2/1977
DE 436652 A 1/1994

OTHER PUBLICATIONS

PCT Form/ISA/220, International Search Report for Application, PCT/US 00/16066; Jun. 12, 2000.

* cited by examiner

*Primary Examiner*—Daniel W. Howell
(74) *Attorney, Agent, or Firm*—Foley & Lardner

(57) ABSTRACT

A guide for setting the depth of cut of a cutting tool, or other hand-held power tool, which automatically locks into a desired position to set the depth of a cut without requiring manual operation of a locking knob or similar structure. The depth guide is released from the locked Position by actuation of a release switch. The depth guide includes a depth guide base, a depth guide shaft attached to the depth guide base, and an automatic locking and release mechanism coupled to the depth guide shaft. The automatic locking and release mechanism and depth guide shaft may be mounted in a handle of the hand-held power tool, such as a detachable handle, for mounting the depth guide to the tool. A dust collector is provided for removing cutting debris which may accumulate in the base of a depth guide around the point of a cut.

27 Claims, 6 Drawing Sheets

AUTOMATIC LOCKING DEPTH GUIDE FOR CUTTING TOOLS AND THE LIKE

FIELD OF THE INVENTION

This invention pertains generally to hand-held power tools, such as spiral cutting tools, and accessories therefore, and more particularly to adjustable depth guides for setting the depth of cut to be made by such power tools.

BACKGROUND OF THE INVENTION

A spiral cutting tool is a hand-held power tool having an electric motor that rotates a spiral cutting tool bit at high speeds. A spiral cutting tool bit includes a sharp cutting edge that is wrapped in a spiral around the axis of the bit. The spiral cutting tool bit is designed for cutting perpendicular to the axis of the bit. The electric motor that drives the bit is enclosed in a motor housing. The motor housing is generally cylindrical in shape, with the spiral cutting tool bit extending from one end of the motor housing along the axis of the housing. A spiral cutting tool is used to remove material from a work piece by moving the rotating spiral cutting tool bit through the work piece in a direction perpendicular to the axis of rotation of the bit. A spiral cutting tool is conventionally operated by grasping the motor housing with one or both hands, turning on the electric motor to begin high speed rotation of the spiral cutting tool bit, plunging the spinning spiral cutting tool bit into a work piece, such as a piece of wood, and then moving the cutting tool bit through the work piece in a direction perpendicular to the axis of the spiral cutting tool bit by moving the motor housing in a direction parallel to the plane of the work piece while keeping the axis of the motor housing generally perpendicular to the work piece surface.

Precise control of a cut being made by a spiral cutting tool, or any other hand-held power tool, is dependent upon the tool operator maintaining a firm grasp on the tool. Various methods have been employed to ensure that an operator maintains a firm grip on a hand-held power tool. With extended and continuous operation, the motor housing of a spiral cutting tool can become warm, and cutting tool vibrations may cause an operator's hands and arms to become fatigued. Extended and continuous use of a spiral cutting tool by grasping the motor housing can, therefore, become uncomfortable, reducing the ability of the operator to control precisely the cut being made. U.S. Pat. No. 5,813,805, issued to Robert K. Kopras, describes a detachable handle for spiral cutting tools and other similar hand-held power tools. The detachable handle provides for extensive continuous use of the power tool while maintaining operator comfort and cutting tool control. The handle may be attached securely to the spiral cutting tool when the tool is to be used for extended periods of time, or generally to enhance the operator's comfort and control in using the spiral cutting tool. The handle may be removed from the tool, for example, when the spiral cutting tool is to be used in tight quarters wherein the handle might become an obstacle to precise control of the spiral cutting tool. The handle is removably secured to the spiral cutting tool by threaded knobs that are inserted through mounting holes in the ends of the handle and tightly threaded into threaded holes formed in handle lugs extending from the motor housing. The threaded knobs are preferably designed so that the detachable handle may be secured tightly to the handle lugs by hand, without the need for a wrench or other tool. The detachable handle also features compartments formed therein for holding various spiral cutting tool accessories, such as extra spiral cutting tool bits and a wrench for securing the bits to the spiral cutting tool.

To set the depth of a cut to be made by a spiral cutting tool, or other hand-held power tool, the tool is typically provided with a depth guide. The depth guide typically includes a depth guide base, which is attached to the power tool housing via one or more depth guide shafts. The depth guide shafts are attached to the power tool housing so as to be slidably movable with respect thereto, thereby allowing the depth guide base to be moved into positions of various distances from the tool, to set various cut depths. A locking knob is typically provided as part of the depth guide which, when tightened, typically by hand, prevents movement of the depth guide shafts and, therefore, movement of the base portion of the depth guide with respect to the tool. To set a depth of cut using such a depth guide, the locking knob is first loosened, to allow movement of the depth guide shafts. The depth guide base is then moved into the desired position to establish the desired depth of cut by moving the depth guide shafts relative to the power tool housing. Markings may be provided, e.g., on the depth guide shafts or on a mechanism attached thereto, to assist in establishing the correct desired cut depth. When the depth guide base is positioned in the desired position, the locking knob is manually tightened, to prevent further movement of the depth guide shafts, and, therefore, of the depth guide base. When locked into position, the bottom of the depth guide base provides a surface which is placed against a work piece to be cut, with a cutting bit extending below the surface by a desired amount corresponding to the depth of cut.

Cutting debris, such as sawdust, can accumulate in the base of a conventional depth guide, around the point of a cut, as the tool to which the depth guide is attached is used to make a cut. The accumulated debris can obscure the point of the cut, i.e., the point where a cutting bit enters a work piece, thereby interfering with accurate use of the tool.

What is desired is a depth guide for setting the depth of cut of a spiral cutting tool, or similar hand-held power tool, which is more easily and rapidly operable than conventional depth guides as described above. What is also desired is a device for removing effectively cutting debris from the base of a depth guide for a hand held power tool.

SUMMARY OF THE INVENTION

The present invention provides a depth guide for setting the depth of cut of a spiral cutting tool, or similar hand-held power tool, which automatically locks into a desired position to set the depth of a cut without requiring manual operation of a locking knob or similar structure. The depth guide is released from the locked position by actuation of a release switch. Thus, a depth guide in accordance with the present invention is more easily operable than conventional hand-held power tool depth guides. A depth guide in accordance with the present invention may be mounted in a handle of a hand-held power tool, such as a detachable handle, for mounting the depth guide to a housing of the tool.

An automatic locking depth guide in accordance with the present invention includes a base portion, a depth guide shaft attached to the base portion, and an automatic locking and release mechanism coupled to the depth guide shaft. The automatic locking and release mechanism allows limited sliding movement of the depth guide shaft, automatically prevents movement of the depth guide shaft when the shaft is moved into a desired position to set a desired depth of cut, and releases the shaft from the locked position, to allow motion of the depth guide shaft, in response to the actuation of a release switch. By moving the depth guide shaft in extending and retracting directions, the depth guide base is moved away from and toward a hand-held power tool to which the depth guide is attached, thereby adjusting the depth of cut to be made by the tool. In accordance with the present invention, the depth guide shaft is preferably biased into an extended position, e.g., by a compression spring. The automatic locking and release mechanism preferably includes a mechanism for automatically locking the depth guide shaft into a locked position by preventing movement of the depth guide shaft in an extending direction while allowing movement of the depth guide shaft in a retracting direction. A depth adjustment mechanism for setting one or more depths of cut is provided for preventing movement of the depth guide shaft in a retracting direction beyond a selected amount. The depth of cut for a spiral cutting tool, or other hand-held power tool, may be established using a depth guide in accordance with the present invention by first setting the depth adjustment mechanism to set a desired depth of cut and then simply moving the tool to which the depth guide is attached toward the depth guide base, i.e., by moving the depth guide shaft in a retracting direction, until the depth adjustment mechanism prevents further movement of the depth guide shaft. At this point, the automatic locking mechanism will lock the depth guide shaft into position, preventing further movement thereof, and, thereby, establishing the desired depth of cut. The tool may then be used to make a cut of the desired depth by placing a bottom surface of the depth guide base against a work piece to be cut, with a cutting bit extending below the bottom surface of the depth guide base by a selected amount established by the position of the depth guide, to make a cut of the desired depth. The depth guide shaft may be released from the locked position, to allow motion of the depth guide shaft into an extended position, by actuation of the release switch.

A depth guide in accordance with the present invention is preferably adapted to be attached to the housing of a spiral cutting tool, or similar hand-held power tool. For example, a depth guide in accordance with the present invention may be mounted in a handle attached to the tool housing. Preferably, the automatic locking and release mechanism and depth guide shaft are mounted in a detachable handle which is securely attachable to, and removable from, the housing of a spiral cutting tool or other hand-held power tool. The depth guide shaft is preferably mounted such that it extends from a lower portion of the detachable handle, with the depth guide base attached thereto so as to extend at a right angle from a lower portion of the shaft around the position of, e.g., a spiral cutting tool bit attached to the spiral cutting tool, i.e., around the point of a cut to be made by the spiral cutting tool. The release switch is preferably mounted near the top of the tool handle, for easy operation by an operator of the tool to release the depth guide shaft from a locked position. The depth adjustment mechanism may be implemented as an adjustable depth adjustment screw mounted in the handle and extending therefrom and a depth adjustment stop, e.g., attached to the depth guide base and/or depth guide shaft, and positioned to contact the depth adjustment screw when the depth guide shaft is moved in a retracting direction, thereby to prevent movement of the depth guide shaft in a retracting direction beyond a selected amount. The depth adjustment stop may be movably mounted around the depth guide shaft and provide a plurality of stop positions that are individually moveable into alignment with the depth adjustment screw. A height adjustment mechanism, e.g., a screw threaded into an aperture formed in the stop position of the depth adjustment stop, may be used to predefine a depth of cut at each depth adjustment stop position, thereby predefining a plurality of cut depths to which the depth guide may be adjusted.

The depth guide base preferably has a depth guide base aperture formed therein. A cutting bit attached to the tool to which the depth guide is attached extends through the depth guide base aperture below the bottom surface of the depth guide base, to cut a work piece at the desired depth established by the depth guide. Cutting debris, e.g., sawdust from a work piece being cut, may collect and build up in the depth guide base around the depth guide base aperture during use, thereby obscuring the point of a cut. The present invention provides a dust collector for removing such cutting debris from the depth guide base. The dust collector includes an outer wall, a top wall attached to a top edge of the outer wall, and a conduit attached to either the outer or top wall of the dust collector and extending therefrom. The dust collector is adapted to be attached to the depth guide base by positioning the outer wall of the dust collector on or within the depth guide base. The top wall of the dust collector includes an aperture formed therein. When the dust collector is positioned in the depth guide base, the aperture in the top wall of the dust collector is aligned with the cutting bit attached to the tool to which the depth guide is attached, such that the cutting bit passes therethrough. The outer wall and top wall of the dust collector define a space between the work piece and the dust collector around the point of a cut being made by the tool. Vacuum suction provided to the conduit pulls the cutting debris from this space through the conduit, to thereby clear the cutting debris away from the point of a cut, and thereby preventing cutting debris which may obscure the point of cut from building up in the depth guide base.

Further objects, features and advantages of the invention will be apparent from the following detailed description taken in conjunction with the accompanying drawings.

DETAILED DESCRIPTION OF THE INVENTION

Figure 1:
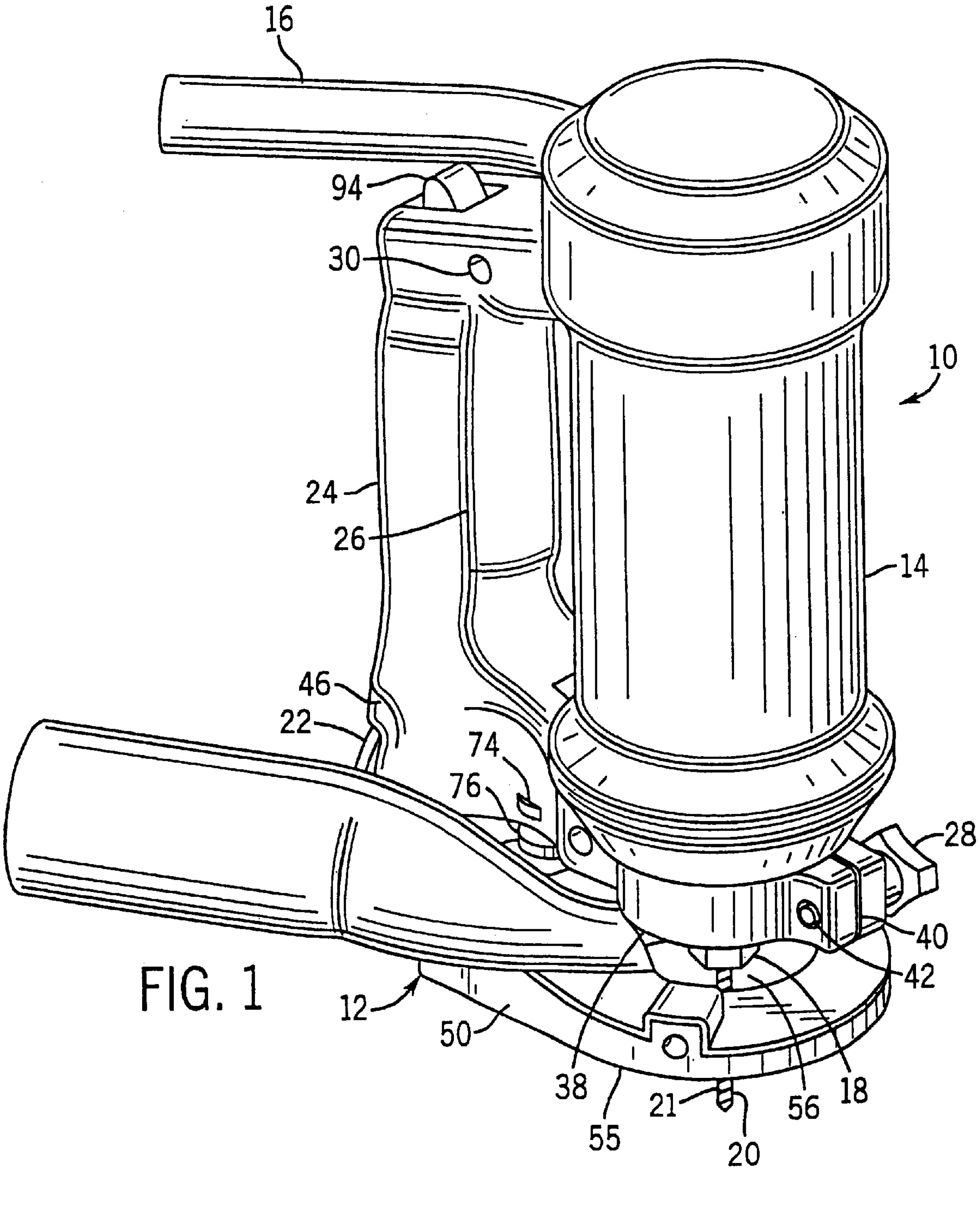
FIG. 1 is a perspective view of a spiral cutting tool including an exemplary automatic locking depth guide in accordance with the present invention attached thereto.
Figure 2:
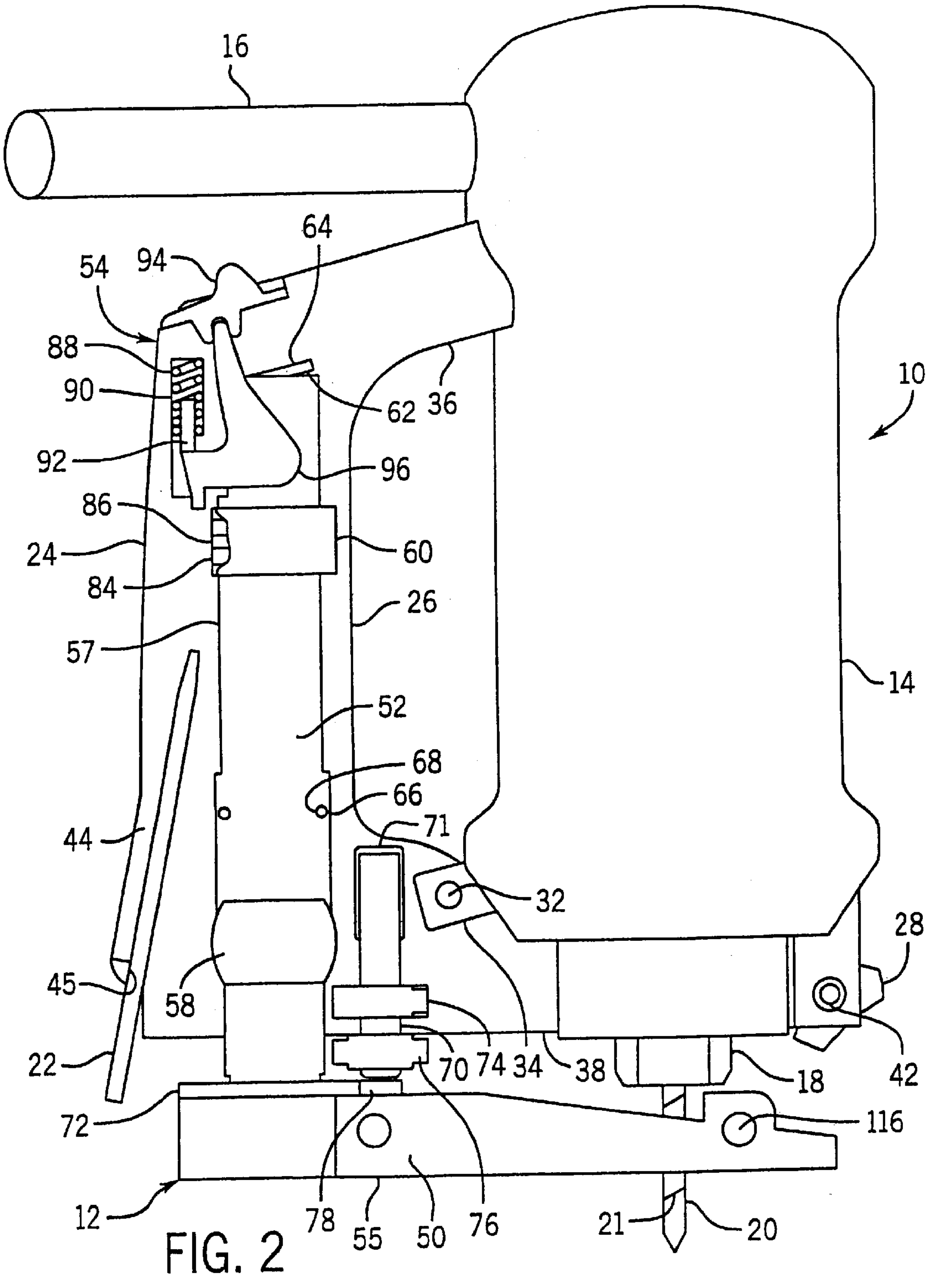
FIG. 2 a side view of a spiral cutting tool including an exemplary automatic locking depth guide in accordance with the present invention attached thereto, with a cutting tool handle shown in cross-section to show an automatic locking and release mechanism of the depth guide mounted therein.
Figure 3:
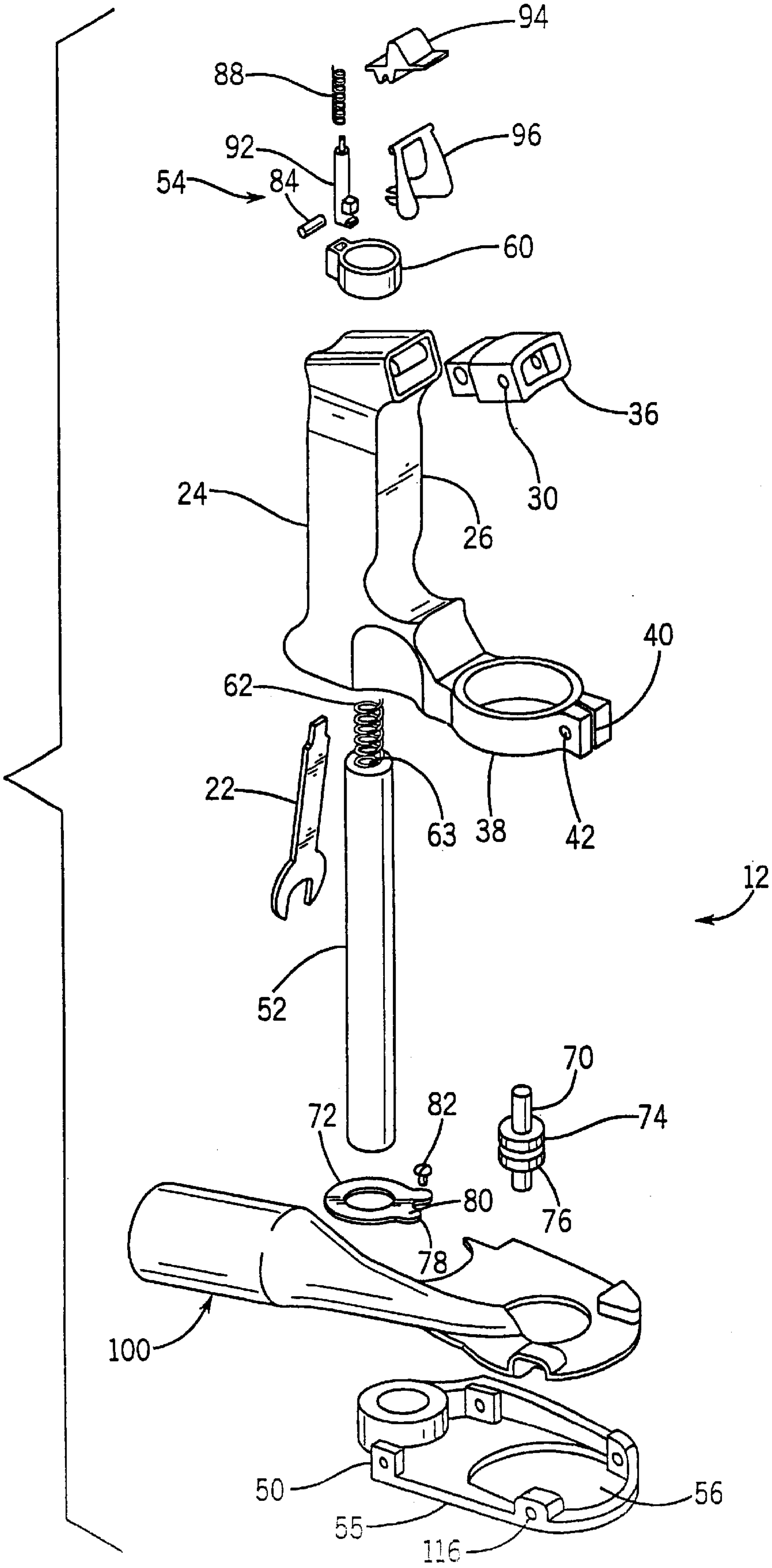
FIG. 3 is an exploded perspective view of the components of an exemplary automatic locking depth guide in accordance with the present invention.
Figure 4:
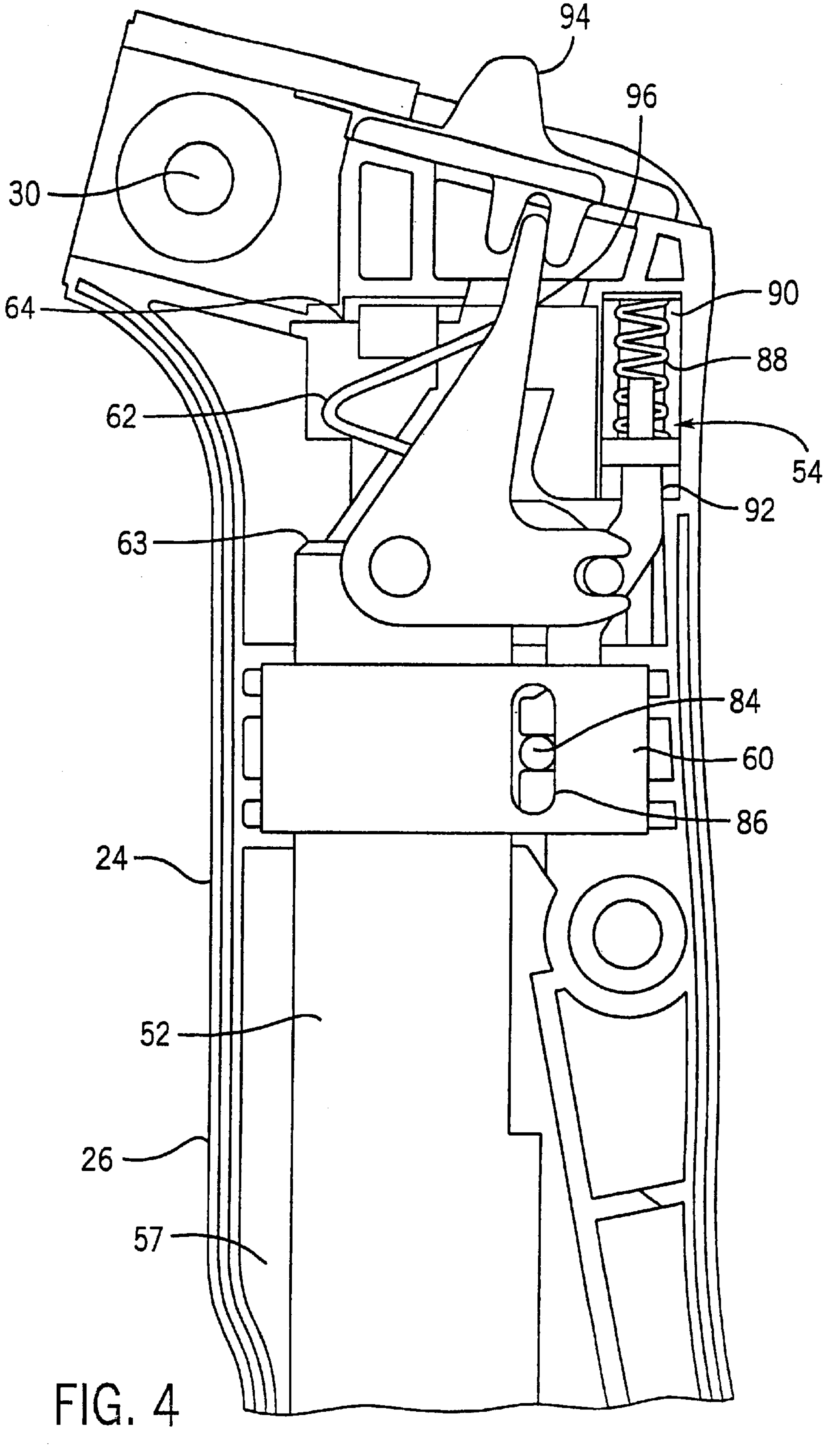
FIG. 4 is a side view illustration in further detail of an exemplary automatic locking and release mechanism for an automatic locking depth guide in accordance with the present invention.
Figure 5:
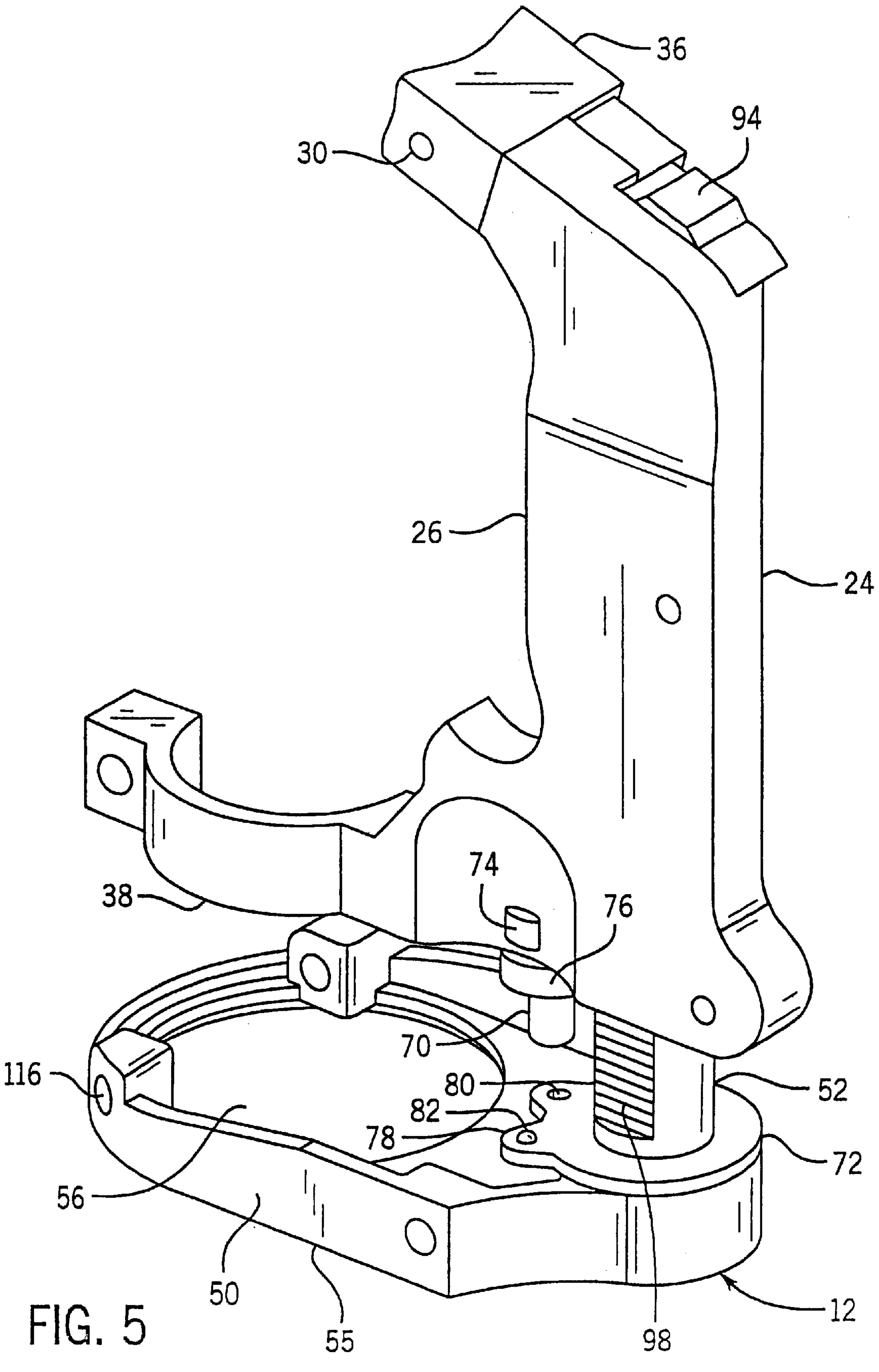
FIG. 5 is a perspective view of an exemplary automatic locking depth guide in accordance with the present invention mounted in a detachable handle for a spiral cutting tool.

A spiral cutting tool 10, with an automatic locking depth guide 12 in accordance with the present invention attached thereto, is shown generally in FIGS. 1 and 2. Although described in detail herein with respect to a particular type of spiral cutting tool 10, it should be noted that the present invention is not limited in application to any particular spiral cutting tool design. The automatic locking depth guide of the present invention may be used with other types of spiral cutting tools, or similar hand-held power tools. For example, the automatic locking depth guide of the present invention may also be applicable to hand-held routers or similar power tools.

The spiral cutting tool 10 includes a motor housing 14, to which the automatic locking depth guide 12 is attached. The motor housing 14 is made of an electrically insulating material, such as hard plastic. The motor housing 14 is generally cylindrical in shape, and may include raised gripping surfaces (not shown) that allow a firm grip on the cutting tool 10 to be maintained when the cutting tool 10 is grasped around the motor housing 14.

An electric motor (not visible in FIGS. 1 and 2) is enclosed within the motor housing 14. An exemplary electric motor that may be employed is a conventional 4 amp 115–120V AC electric motor with a no-load rotation speed of 30,000 rpm. Other electric motors, including variable speed motors, may also be employed. The motor receives electrical power through an electrical cord 16 (only a portion of which is shown in FIGS. 1 and 2). Electrical cord 16 may preferably include a rubber cover that stays flexible in cold operating environments. A thick rubber connecting sleeve is preferably provided where the electrical cord 16 is joined to the motor housing 14. This connecting sleeve provides strain relief at the end of the electrical cord 16 to prevent crimping, cracking and excessive wear of the cord 16 where it is joined to the cutting tool 10. The electric motor is turned on and off by an on/off switch (not shown) on the motor housing 14. A fan, located within the motor housing 14, is preferably attached to the motor shaft. When the motor is turned on, by means of the on/off switch, the fan is rotated at a high speed to draw air through the motor housing and across the electric motor to thereby cool the motor. For this purpose, air intake vents and exhaust vents are preferably provided in the motor housing 14. Cool air is thus drawn by the motor fan into the motor housing through the air intake vents to cool the electric motor, with warm air exhausted from the motor housing through the exhaust air vents.

An end of the motor shaft extends from one end of the motor housing 14 along the axis thereof. Attached to the end of the motor shaft is a mechanical structure 18 for securing a spiral cutting tool bit 20 to the motor shaft. The spiral cutting tool bit 20 has a cutting edge 21 spiraled around the axis of the bit 20. This cutting edge 21 is designed such that the spiral cutting tool bit 20, when rotated at high speed, will cut through a work piece in a direction perpendicular to the axis of the bit 20. In this cutting process, significant force is applied to the cutting tool bit 20 perpendicular to the axis thereof. Thus, although a conventional drill type chuck may be used for the structure 18 that mechanically connects the bit 20 to the motor shaft, the preferred structure 18 for securing the bit 20 to the shaft is a collet type system. The collet bit attachment system includes a collet nut and a collet centered axially within a central aperture of the collet nut. The collet nut is mounted on a threaded end of the motor shaft. To secure the bit 20 to the motor shaft, a shank of the bit 20 is inserted into the central aperture of the collet. The collet nut is then tightened, first by hand, and then with a wrench 22, until the bit 20 is held securely. As the collet nut is tightened down on the threaded end of the shaft, the collet is compressed within the collet nut between a partially closed end of the collet nut and the shaft. The collet is slotted and has tapered ends, such that when the collet is compressed between the collet nut and the shaft the collet is compressed radially, causing the central aperture of the collet to close tightly around the shank of the spiral cutting tool bit 20. To remove the bit 20 from the motor shaft, the collet nut is loosened, using the wrench 22, until the bit 20 can be easily removed from the central aperture of the collet.

A shaft lock pin may be used to prevent rotation of the motor shaft when the collet nut is being loosened and tightened. The shaft lock pin (not shown) may extend through the motor housing 14. When the shaft lock pin is depressed, it engages the motor shaft, preventing rotation of the shaft, and allowing the collet nut to be loosened and tightened. When the shaft lock pin is released, a spring attached to the shaft lock pin causes the shaft lock pin to become disengaged from the motor shaft, allowing free rotation thereof.

A handle 24 is preferably securely attached to the housing 14 of the cutting tool 10. The handle 24 is preferably made of an electrically insulating material, such as hard plastic, by a conventional process, such as molding. The handle 24 includes a gripping surface 26 which is preferably contoured in shape so that the handle 24 may be grasped comfortably in the hand of an operator of the cutting tool 10. The handle gripping surface 26 is preferably aligned substantially parallel with the axis of the cutting tool housing 14. The handle 24 allows the cutting tool 10 to be grasped firmly and comfortably with two hands, one hand grasping the handle 24 with the other hand grasping the cutting tool housing 14, to provide greater control of the cutting tool 10 during operation, and thereby to provide for more accurate cuts with less operator fatigue. The handle 24 also allows the cutting tool 10 to be grasped more firmly during motor start-up, during which the reaction torque of the cutting tool motor may cause the tool 10 to twist. Thus, the cutting tool handle 24 also facilitates safe use of the cutting tool 10.

It may be desirable, however, that the cutting tool handle 24 be detached for some applications. For example, for use of the tool 10 in close quarters or obstructed areas, the handle 24 may become an obstruction, and actually interfere with accurate use of the tool 10. Thus, the handle 24 is preferably made detachable from the cutting tool 10 when its use would interfere with accurate and safe operation of the cutting tool 10. For example, the handle 24 may be securely, but detachably, attached to the cutting tool 10 at the ends thereof using threaded locking knobs 28 which are inserted through mounting holes 30 formed in the ends of the handle 24 and into corresponding threaded holes 32 formed in lugs 34 attached to and extending from the cutting tool motor housing 14. (Note that the mounting holes 30 may be formed in a removable insert piece 36 which may be inserted into one or both of the ends of the handle 24 before the handle 24 is mounted on the handle lugs 34. Insert pieces 36 of different sizes may be used to allow a detachable handle 24 of a given size to be attached to various different spiral cutting tools 10 having slightly different sizes and shapes.) To detach the handle 24 from the housing 14 the locking knobs 28 are loosened and removed from the handle 24, and the handle 24 is pulled away from the housing 14.

As will be discussed in more detail below, an automatic locking depth guide 12 in accordance with the present invention is preferably mounted in a detachable handle 24 for attachment to the motor housing 14 of a spiral cutting tool 10 or other hand-held power tool. In such a case, in particular, it is important that the detachable handle 24 be very securely attachable to the motor housing 14. Thus, the detachable handle 24 preferably also includes an extending attachment portion 38. The extending attachment portion 38 is preferably shaped and sized to extend snugly around a portion of the motor housing 14. For example, as illustrated in FIGS. 1 and 2, the extending attachment portion 38 may be formed extending from a lower portion of the detachable handle 24 to extend snugly around a lower portion of the motor housing 14, near the position where the motor shaft extends from the motor housing, when the detachable handle 24 is in position on the motor housing 14. An expansion slot 40 formed in the extending attachment portion 38 allows the extending attachment portion 38 to be expanded slightly to fit around the motor housing 14. A locking knob 28 includes a threaded shaft which extends through threaded apertures 42 which are formed in the extending attachment portion 38 on opposite sides of the expansion slot 40. The locking knob 28 may thus be tightened in the apertures 42 to close the expansion slot 40, thereby bringing the sides of the extending attachment portion 38 together to secure the extending attachment portion 38 of the detachable handle 24 tightly around the motor housing 14, thereby also securely attaching the handle 24, with the depth guide 12 mounted therein, to the cutting tool 10.

One or more storage compartments 44 may be formed in the detachable handle 24 in a conventional manner, e.g., by molding into the design of the handle 24. One of the handle storage compartments 44 may preferably be specifically designed to hold a wrench 22 which is used for tightening and loosening the mechanical structure 18 for attaching spiral cutting tool bits 20 to the spiral cutting tool 10, as described above. An aperture 45 in the handle 24 provides access to the wrench compartment 44. The size of the compartment 44 is such that the wrench 22 is held snugly therein, to prevent it from sliding out during operation of the cutting tool 10. As illustrated in FIG. 1, a portion 46 of the handle 24 around the aperture 45 to the wrench compartment 44 is reduced in width such that, when the wrench 22 is placed in the compartment 44, the head of the wrench extends slightly from the sides of the handle 24. This permits the head of the wrench 22 to be grasped to pull the wrench 22 from the compartment 44. Other compartments may also be formed in the handle 24 in a conventional manner.

An exemplary automatic locking depth guide 12 in accordance with the present invention will now be described in further detail with reference to FIGS. 1 through 5. The basic components of an automatic locking depth guide in accordance with the present invention are a depth guide base 50, a depth guide shaft 52, attached to the base 50, and an automatic locking and release mechanism 54, coupled to the shaft 52.

The depth guide base 50 is preferably made of a strong, rigid material. The depth guide base 50 may, for example, be machined from a piece of steel or aluminum. The depth guide base 50 includes a substantially flat bottom surface 55. In use, the bottom surface 55 of the depth guide base 50 is positioned against a work piece being cut as the cutting tool 10 is moved along the work piece. Therefore, the bottom surface 55 of the depth guide base 50 is preferably smooth, such that the bottom surface 55 of the depth guide base 50 and, therefore, the tool 10 attached thereto, slides easily across a work piece during use.

The depth guide base 50 is preferably sized and shaped such that the depth guide base 50 provides a broad and stable base for the tool 10 to which the depth guide 12 is attached. For example, the depth guide base 50 is preferably generally elongated in shape (as illustrated). A large aperture 56 is formed through the depth guide base 50 at or near one end of the elongated base 50. The aperture 56 is positioned on the depth guide base 50 such that, when the depth guide 12 is attached to the cutting tool 10, a cutting bit, such as the spiral cutting tool bit 20, may be extended down through the aperture 56 below the bottom surface 55 of the depth guide base 50 into a work piece to be cut. The aperture 56 may be of any shape or size as desired, provided that the aperture 56 is sufficiently large so as not to interfere with operation of the cutting tool 10 to which it is attached. The depth guide base 50 may preferably entirely surround the aperture 56 (as shown), but need not.

The depth guide shaft 52-is attached to the depth guide base 50 at or near the opposite end thereof from the depth guide base aperture 56. The depth guide shaft 52 preferably extends at a right angle from the depth guide base 50. The depth guide shaft 52 is preferably also made of a strong and rigid material, such as steel or aluminum. The depth guide shaft 52 may be attached to the depth guide base 50 in a conventional manner, such as via welding, or by the use of fasteners, etc.

The depth guide shaft 52 is coupled to the automatic locking and release mechanism 54. The automatic locking and release mechanism 54, along with the shaft 52, is, in turn, attached to a hand-held power tool, such as the spiral cutting tool 10, such that the bottom surface 55 of the depth guide base 50 is perpendicular to the axis of the cutting tool 10 and a cutting bit, such as a spiral cutting tool bit 20, attached to the tool 10 is aligned with the aperture 56 in the base 50. In accordance with the present invention, the automatic locking and release mechanism 54 is preferably mounted within the (preferably) detachable handle 24, such that the depth guide shaft 52 extends therefrom. In this manner, the depth guide 12 is attached to the cutting tool 10 by attaching the detachable handle 24 to the housing 14 of the cutting tool 10, as described above, and is removed from the tool 10 by removing the handle 24. The depth guide base 50 is attached to the end of the depth guide shaft 52 extending from the detachable handle 24 such that when the detachable handle 24 is attached to the cutting tool housing 14, the depth guide base aperture 56 is aligned with the end of the cutting tool 10 from which the motor shaft extends, and to which a cutting bit, e.g., the spiral cutting tool bit 20, may be attached. The automatic locking and release mechanism 54 and the depth guide shaft 52 are mounted in the detachable handle 24 such that, when the detachable handle 24 is attached to the housing 14 of the cutting tool 10, the depth guide shaft 52 extends substantially parallel to the axis of the cutting tool 10, and the depth guide base 50 is thus positioned substantially perpendicular to the axis of the cutting tool 10. It should be understood that the depth guide 12 may be attached in other ways to the cutting tool 10. For example, the depth guide 12 may be mounted in a handle 24 for the cutting tool 10 which is permanently attached thereto, rather than removable. Alternatively, the depth guide 12 may be attached to the cutting tool 10 by mounting the automatic locking and release mechanism 54 and depth guide shaft 52 within an extending portion of the tool housing 14, such that the depth guide shaft 52 extends therefrom and the aperture 56 in the depth guide base 50 is properly positioned with respect to a cutting bit mounted to the cutting tool 10.

The depth guide shaft 52 is preferably mounted in the handle 24 so as to be slidably movable therein. For example, the depth guide shaft may be mounted in a chamber 57 formed in the handle 24 to extend from an aperture in the end thereof. The chamber 57 may be formed in a conventional manner, e.g., by defining the chamber 57 during molding of the plastic handle 24. At least one, and preferably two, bushings 58 and 60 are preferably mounted in the chamber 57 formed in the detachable handle 24, to support the depth guide shaft 52 for slidable movement therein. The bushings 58 and 60 are preferably made of a strong and rigid material, such as brass, steel or aluminum, and may be mounted in the chamber 57 formed in the handle 24 in a conventional manner. For example, where the handle 24 is made of a molded plastic material, appropriate recesses may be molded into the handle 24 adjacent to the chamber 57 to support the bushings 58 and 60 in position.

The depth guide shaft 52 is preferably biased in an extending direction, i.e., outward from the handle 24. This may preferably be accomplished by use of a compression spring 62. The compression spring 62 may be mounted in a conventional manner within the chamber 57 formed in the handle 24 to bias the depth guide shaft 52 in the extending direction from the chamber 57. For example, a lower end of the compression spring 62 may be mounted within a central aperture 63 formed in the depth guide shaft 52. The upper end of the spring 62 preferably extends outward from the top end of the depth guide shaft 52 to rest against a seat 64 formed on the inside top of the chamber 57 formed in the handle 24.

Movement of the depth guide shaft 52 in an extending direction, outward from the handle 24, and in a retracting direction, into the handle 24, moves the depth guide base 50 attached thereto away from and toward the tool 10 to which the depth guide 12 is attached, respectively. Thus, movement of the depth guide shaft 52 is used to adjust the depth guide 12 to set a desired depth of cut.

Movement of the depth guide shaft 52 outward from the handle 24, in an extending direction, is preferably limited such that the depth guide shaft 52 does not come out of the end of the handle 24. Extending movement of the depth guide shaft 52 may be limited, for example, by use of a ring 66 mounted to extend radially from, e.g., a notch 68 formed around the depth guide shaft 52. As the depth guide shaft 52 is moved in the extending direction, out of the handle 24, the ring 66 contacts a stop, e.g., provided by the bushing 58, which prevents further extending movement of the depth guide shaft 52 beyond a maximum extension. The depth guide shaft 52 is preferably allowed to extend from the handle 24 by a sufficient distance such that when the depth guide shaft 52 is fully extended, a cutting bit, such as a spiral cutting tool bit 20, mounted on the cutting tool 10 to which the depth guide 12 is attached, does not extend below the bottom surface 55 of the depth guide base 50. Thus, when the depth guide shaft 52 is fully extended, the tool 10 to which the depth guide 12 is attached may be stood upright on the depth guide base 50, even with a bit 20 attached to the tool 10. In this fully extended position of the depth guide shaft 52 there is no depth of cut, since the bit 20 does not extend below the bottom surface 55 of the depth guide base 50.

Movement of the depth guide shaft 52 into the handle 24, in a retracting direction, is ultimately limited by either the top end of the depth guide shaft 52 contacting the upper surface 64 of the chamber 57 formed in the handle 24, in which the shaft 52 is mounted, or by a bottom portion of the handle 24 contacting an upper surface of the depth guide base 50. This fully retracted position of the depth guide shaft 52 represents the maximum possible depth of cut for a cutting tool bit 20 of a given length.

In accordance with the present invention, a depth adjustment mechanism is preferably provided for establishing one or more intermediate depths of cut between the maximum and minimum (no cut) depths of cut defined by the maximum distance of travel of the depth guide shaft 52 in the handle 24. An exemplary mechanism for providing such depth of cut adjustment includes a depth adjustment screw 70 in combination with a depth adjustment stop 72. The depth adjustment screw 70 may be a mounted in a chamber 71 formed in the handle 24 to run parallel with the depth guide shaft 52. A portion of the depth adjustment screw 70 extends from a bottom portion of the handle 24, preferably near the location where the depth guide shaft 52 extends from the handle 24. The depth adjustment screw 70 is preferably implemented as a threaded rod which is held in the handle 24 by threading the depth adjustment screw 70 through the central aperture of a first nut 74 which is mounted in position in the handle 24. The first nut 74 is mounted in the handle 24 to extend therefrom and in a manner such that the first nut 74 may be rotated therein. A second nut 76 is threaded onto the portion of the depth adjustment screw 70 which extends outside of the handle 24. Both the first 74 and second 76 nuts preferably have a rounded outer circumference with knurling formed thereon to allow the first 74 and second 76 nuts to be adjusted by hand without slipping. Rotation of the depth adjustment screw 70 in the handle 24 is prevented, e.g., by a flattened side of the depth adjustment screw 70 which is positioned against an appropriate structure molded into the handle 24 to prevent rotation of the screw 70, but which allows movement of the screw 70 in a direction in and out of the handle 24. Thus, by operation of the first 74 and second 76 nuts, the amount by which the depth adjustment screw 70 extends from the handle 24 may be set. For example, by rotating the first nut 74, the amount by which the depth adjustment screw 70 extends from the handle 24 is adjusted. Once the depth adjustment screw 70 is extended from the handle 24 by the appropriate amount, to define a desired depth of cut, the second nut 76 is tightened by hand against the bottom surface of the handle 24. The second nut 76 thus forms a lock nut for locking the depth adjustment screw 70 in a desired position.

The depth adjustment stop 72 is attached to the depth guide base 50 and/or the depth guide shaft 52 (or is formed as a portion thereof) and is positioned thereon to contact the depth adjustment screw 70 when the depth guide shaft 52 is moved in a retracting direction, into the handle 24, to prevent further movement of the depth guide shaft 52 in a retracting direction beyond a selected amount. The depth adjustment stop 72 may take any form which performs this function.

Preferably, the depth adjustment stop 72 may be formed as a flattened ring positioned around the base of the depth guide shaft 52, adjacent to the depth guide base 50. The depth adjustment stop 72 may thus extend radially from the base of the depth guide shaft 52 a sufficient distance such that when the depth guide shaft 52 is pushed up into the handle 24, in the retracting direction, the depth adjustment screw 70 is brought down into contact with a portion of the depth adjustment stop 72 to prevent further movement in this direction. The depth adjustment stop 72 may preferably be mounted for rotational movement with respect to the depth guide shaft 52. Thus, the depth adjustment stop 72 may be rotated about the shaft 52 to align a selected one of a plurality of depth stop positions with the depth adjustment screw 70. As illustrated, each depth stop position may be formed as an extension 78 extending radially from the depth adjustment stop 72. (Downward movement of the handle 24 with respect to the depth guide base 50 is stopped when the bottom of the depth adjustment screw 70 contacts an extending portion 78 of the depth adjustment stop 72.) The depth adjustment stop 72 may be formed with detents in a conventional manner, such that there is increased resistance to rotation of the depth adjustment stop 72 when a selected one of the depth adjustment stop extending portions 78 (depth stop positions) is aligned with the depth adjustment screw 70, (thus, the depth adjustment stop 72 will not rotate unintentionally from such a position). Each extending portion 78 of the depth adjustment stop (depth stop position) 72 may preferably include a threaded aperture 80 formed therein. A screw 82, or other structure, may be threaded into the aperture 80 in the extending portion 78 (depth stop position) of the depth adjustment stop 72 to extend therefrom toward the depth adjustment screw 70. The screw 82, or other structure, may be adjusted to extend a selected distance from the depth adjustment stop 72. When the depth adjustment stop 72 is moved into a position such that an extending portion 78 (depth stop position) with a screw 82 or other structure extending therefrom is aligned with the depth adjustment screw 70, retracting movement of the depth guide shaft 52 will be limited by the depth adjustment screw 70 contacting the screw 82 or other structure. A plurality of such screws 82 or other structures, threaded into apertures 80 formed in multiple extending portions 78 (depth stop positions) of the depth adjustment stop 72, may be employed and adjusted to extend various distances from the depth adjustment stop 72. By rotating the depth adjustment stop 72 to align selected ones of the screws 82 or other structures extending therefrom with the depth adjustment screw 70, the depth adjustment stop 72 may be used to define multiple depths of cut, without adjusting the depth adjustment screw 70. For example, for a depth adjustment screw 70 set to extend from the handle 24 by a selected distance, different depths of cut, i.e., different maximum retracting distances of the depth guide shaft 52, may be defined by the use of multiple screws 82 or other structures extending different distances from apertures 80 formed in the extending portions 78 (depth stop positions) of the depth adjustment stop 72. A desired depth of cut may be set by rotating the depth adjustment stop 72 into a position to align the extending portion 78 (depth stop position) which defines the desired depth of cut with the depth adjustment screw 70.

In accordance with the present invention, the depth of cut to be made by a spiral cutting tool, or other hand-held power tool, to which the depth guide 12 is attached, is established by moving the depth guide shaft 52 in a retracting direction until further movement of the shaft is prevented by the depth adjustment screw 70 contacting the depth adjustment stop 72. In accordance with the present invention, movement of the depth guide shaft 52 in the extending direction is automatically prevented when the depth guide is moved into such a position. In other words, in accordance with the present invention, the depth guide shaft 52 is automatically locked into position when the depth guide shaft 54 is moved into a desired position to establish a desired depth of cut. The automatic locking and release mechanism 54, coupled to the depth guide shaft 52, performs this function.

In accordance with the present invention, the automatic locking and release mechanism 54 automatically locks the depth guide shaft 52 into a locked position when a depth of cut is selected by preventing movement of the depth guide shaft 52 in an extending direction while allowing movement of the depth guide shaft 52 in a retracting direction. This may be accomplished by use of a locking pin 84, rod, or dowel, which is mounted in a slot 86 formed at an angle to the depth guide shaft 52 and adjacent thereto. The pin 84 may be formed, e.g., as a short metal rod. The slot 86 may be formed, as shown, in one of the bushings 60 used to support the depth guide shaft 52 in the chamber 57 formed in the handle 24. Alternatively, the slot 86 may be formed, e.g., in a molded structure formed in the handle chamber 57 itself. The slot 86 is formed so as to angle toward the depth guide shaft 52 near the bottom thereof and to angle away from the depth guide shaft 52 near the top thereof. The pin 84 is positioned in the slot 86 such that the axis of the pin 84 is oriented perpendicularly to the axis of the depth guide shaft 52. The slot 86 is positioned with respect to the depth guide shaft 52 such that the pin 84 contacts a surface of the depth guide shaft 52 when the pin 84 is positioned toward the bottom of the slot 86. Preferably, the portion of the depth guide shaft 52 which is adjacent to and in contact with the pin 84 is flattened, to increase the surface area of contact between the pin 84 and the depth guide shaft 52 when the pin 84 is in contact with the depth guide shaft 52. The pin 84 is biased downward in the slot 86, i.e., toward the bottom of the slot 86, which is angled toward the depth guide shaft 52. Thus, the pin 84 is biased against the e.g., flattened portion of the depth guide shaft 52. The pin 84 may be biased into this position by operation of, for example, a compression spring 88 mounted in a chamber 90 formed in the handle 24. The chamber 90 may be formed in the handle 24 in a conventional manner, e.g., during the process of molding the plastic handle 24. The biasing spring 88 may be coupled to the pin 84 by a linkage 92.

As the depth guide shaft 52 is moved in a retracting direction, into the handle 24, the pin 84 is pushed upward in the slot 86 by the shaft 52, against the bias provided by the spring 88 via the linkage 92. As the pin 84 moves upward in the angled slot 86, it is moved away from the depth guide shaft 52. Thus, the depth guide shaft 52 is allowed to move freely in the retracting direction 52, thereby to move the tool 10 to which the depth guide 12 is attached downward, toward the depth guide base 50. When the retracting movement of the depth guide shaft 52 is completed, e.g., when the depth guide shaft 52 is moved in a retracting direction until the depth adjustment screw 70 contacts the depth adjustment stop 72, the pin 84 is biased downward in the angled slot 86 by the spring 88, against the, e.g., flattened portion of the depth guide shaft 52. In this position, the pin 84 prevents movement of the depth guide shaft 52 in an extending direction. Thus, the depth guide shaft is automatically locked into a desired position by the locking mechanism formed by the pin 84 mounted in the angled slot 86 and biased against the depth guide shaft 52 by the spring 88 and linkage 92. No knobs or other manual mechanism need be tightened to lock the depth guide shaft 52 into the desired position.

The depth guide shaft 52 is preferably released from the locked position by actuation of a release switch 94. The release switch 94 is preferably mounted on the detachable handle 24 and projects therefrom in a position which is easily operable by an operator of the tool 10 to which the depth guide 12 is attached. For example, the release switch 94 may be positioned on the handle 24 so as to be easily operable by the thumb of an operator grasping the tool 10 by the handle 24. The release switch 94 may be mounted in the handle 24 in a conventional manner for, e.g., sliding, or other movement therein. The release switch 94 is coupled to the pin 84 such that when the release switch 94 is actuated the locking pin 84 is pulled upward in the angled slot 86, i.e., away from the depth guide shaft 52. This releases the depth guide shaft 52 from the locked position, i.e., allowing extending movement of the depth guide shaft 52. The release switch 94 may be coupled to the locking pin 84 in a conventional manner. For example, as illustrated, a lever 96 mounted in the detachable handle 24 may be used to couple the release switch 94 to the linkage 92 which, as discussed above, is coupled to the locking pin 84.

An automatic locking depth guide in accordance with the present invention may be used to easily and rapidly establish a desired depth of cut for a spiral cutting tool, or other hand-held power tool, in the following manner. A cutting bit, e.g., a spiral cutting tool bit 20, is attached to the tool 10 in the manner described above. The depth guide 12, e.g., mounted in the detachable handle 24, is also attached to the tool 10, as described above. With the depth guide shaft 52 in an extended position, the lock nut 76 mounted on the depth adjustment screw 70 outside of the handle 24 is loosened. The other nut 74 mounted on the depth adjustment screw 70 is then turned until the depth adjustment screw 70 extends from the handle 24 by a desired amount. The nut 76 is then tightened against the handle 24, to lock the depth adjustment screw 70 in the desired position. The depth adjustment stop 72 is then positioned such that an extending portion 78 thereof (a depth stop position) is aligned with the depth adjustment screw 70. If a screw 82 or other structure is positioned in an aperture 80 formed in the extending portion 78 of the depth adjustment stop, the screw 82 may be adjusted to a desired height. Screws 82 or other structures mounted in other extending portions 78 (depth stop positions) of the depth adjustment stop 72 may be set to other desired heights. The depth guide shaft 52 is then moved in a retracting direction, e.g., by moving the tool 10 toward the depth guide base 50, until the depth adjustment screw 70 contacts the depth adjustment stop 72. By action of the automatic locking and release mechanism 54, the depth guide shaft 52 will automatically lock into this position. The tool operator may then verify that the cutting bit 20 extends by a desired distance below the bottom surface 55 of the depth guide base 50. This distance is the depth of cut which is set by the particular combination of depth adjustment screw extension and depth stop position selected. The depth adjustment shaft 52 may then be released from the locked position, by actuation of the release switch 94. By action of the compression spring 62, the depth guide shaft 52 will be extended once again into the fully extended position. The depth adjustment screw 70 and/or screw 82 or other structure mounted in the depth adjustment stop 72 may then be adjusted to fine tune the desired depth of cut. This process may be repeated until one or more desired depths of cut are established using the depth adjustment screw 70 and screws 82 or other structures mounted in the depth adjustment stop 72. Gradation markings 98 may be provided, e.g., on the depth guide shaft 52 (see FIG. 5), to assist the operator in this process of establishing one or more desired cut depths.

Having pre-defined desired depths of cut using the depth adjustment screw 70 and depth adjustment stop 72, the spiral cutting tool 10 or other hand-held power tool to which the depth guide 12 is attached may be used to make a cut of the desired depth. The cutting tool motor is turned on to start rotation of the cutting bit 20. The bottom surface 55 of the depth guide base 52 is then positioned against the work piece to be cut. The tool 10 is moved downward, i.e., the depth guide shaft 52 is moved in a retracting direction into the handle 24, until the depth adjustment screw 70 contacts the depth adjustment stop 72. At this point, the depth guide shaft 52 is automatically locked into the desired position, with the cutting bit 20 extending below the bottom surface 55 of the depth guide base 50 by the desired amount to make a cut of the desired depth. The tool 10 is then moved along the work piece, with the bottom surface 55 of the depth guide base 50 on the work piece, to make a cut of the desired depth into the work piece. When the cut is complete, the release switch 94 may be actuated to release the depth guide from the locked position, such that the depth guide shaft 52 is released into its fully extended position. Thus, the present invention provides a depth guide for a spiral cutting tool, or other hand-held power tool, in which the depth guide is locked into a position to provide a desired depth of cut automatically, without the need for e.g., manually tightening a knob, and is released from the locked position by simple actuation of a release switch 94, i.e., without the need for loosening a knob. A subsequent cut of the same depth may be made by simply moving the depth guide shaft 52 into the retracted position once again. A subsequent cut of a different depth may be made by moving the depth adjustment stop 72 into another position such that another extending portion 78 (depth stop position) having a screw 82 or other structure mounted therein at a different height is aligned with the depth adjustment screw 70 before the depth guide shaft 52 is moved into the retracted position.

During use of a cutting tool 10 with a depth guide 12 attached thereto, cutting debris, e.g., sawdust and wood chips, may accumulate in and around the aperture 56 formed in the base 50 of the depth guide 12. This is due in part to the portion of the depth guide base 50 which surrounds the point of a cut preventing such cutting debris from easily blowing away from the point of cut. Such accumulated debris near the point of a cut can obscure visibility of the point where the cutting bit 20 enters the work piece, thereby making an accurate cut using the cutting tool 10 to which the depth guide 12 is attached more difficult.

Figure 6:
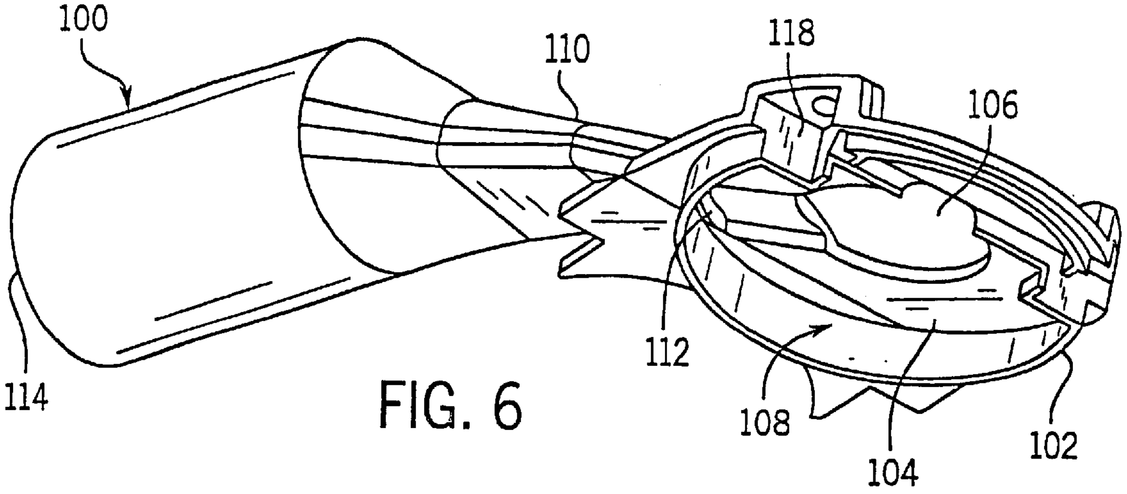
FIG. 6 is a perspective view of the underside of a dust collector for use in combination with the base portion of a depth guide in accordance with the present invention.

In accordance with the present invention, a dust collector 100 is preferably provided for removing the cutting debris which may accumulate in a depth guide base 50 around the point of a cut during use of the cutting tool 10. An exemplary dust collector 100 in accordance with the present invention will be described in detail with reference to FIGS. 3 and 6. The dust collector 100 to be described may preferably be formed as a single piece, in a conventional manner, e.g., of molded plastic. The dust collector 100 preferably includes an outer wall 102 which is preferably sized and shaped to fit within the depth guide base 50 around the depth guide base aperture 56. A top wall 104 is attached to a top edge of the outer wall 102. The top wall 104 has an aperture 106 formed therein which is aligned with the axis of the spiral cutting tool 10 and which allows a spiral cutting tool bit 20 to pass therethrough when the dust collector 100 is mounted on the depth guide base 50. The outer 102 and top 104 walls define an inner space 108 of the dust collector 100. A conduit 110 is connected to the outer 102 and/or top 104 walls of the dust collector 100 and extends therefrom. The conduit 110 has an interior which is in fluid communication with the inner space 108 defined by the outer 102 and top 104 walls of the dust collector 100, e.g., via an aperture 112 formed in either the side 102 or top 104 wall of the dust collector 100. The conduit 110 is adapted to have a vacuum source, e.g., vacuum hose, connected to a proximal end 114 thereof.

In use, the dust collector 100 is mounted on the depth guide base 50. The dust collector 100 is preferably removably attachable to the depth guide base 50. For this purpose, threaded apertures 116 may be formed in vertically extending portions of the depth guide base 50. The dust collector 100 is positioned on the depth guide base 50 such that the outer wall 102 is aligned with the aperture 56 formed in the depth guide base 50. Screws or other fasteners may be inserted through the apertures 116 formed in the depth guide base 50 and into corresponding apertures, slots, or other structures 118 formed in the outer wall 102 of the dust collector 100, to secure the dust collector 100 to the depth guide base 50.

When the tool 10, with the depth guide 12 and dust collector 100 attached thereto, is used to make a cut, the inner space 108 of the dust collector which is defined by the outer 102 and top 104 walls thereof will be closed at least partially by the work piece positioned against the bottom surface 55 of the depth guide base 50. Sawdust or other debris will collect in the space 108, being prevented from blowing around a work space by the outer 102 and top 104 walls and the dust collector 100. Cutting debris is removed from the space 108 via the aperture 112 and the conduit 110 by a conventional vacuum source (not shown) attached to the proximal end 114 of the dust collector conduit 110. Thus, the dust collector 100 may be used to remove cutting debris from the point of a cut when a tool 10 with a depth guide 12 attached thereto is in use, thereby to improve the operator's ability to see the point where the cutting bit 20 enters a work piece, thereby to make a more accurate cut.

It should be understood that a dust collector 100 in accordance with the present invention may be used in combination with any depth guide or other hand-held power tool accessory which includes a base portion which extends around the point of a cut and in which cutting debris may collect, to remove the cutting debris therefrom. Thus, it should be understood that a dust collector 100 in accordance with the present invention is not limited to use in combination with the automatic locking depth guide 12 illustrated and described herein, or for use with the particular spiral cutting tool 10 described, by example, herein.

The present invention is not confined to the particular embodiments herein illustrated and described, but embraces such modified forms thereof which come within the scope of the following claims.

What is claimed is:

1. A depth guide for a hand-held power tool, comprising:

(a) a hand-held power tool handle;

(b) a depth guide base;

(c) a depth guide shaft attached to the depth guide base and mounted in the hand-held power tool handle such that the depth guide shaft extends from the hand-held power tool handle.

2. A depth guide for a hand-held power tool, comprising:

(a) a depth guide base;

(b) a depth guide shaft attached to the depth guide base; and (c) a locking and release mechanism coupled to the depth guide shaft locking the depth guide shaft into a locked position when the depth guide shaft is moved into a desired position and a release switch coupled to the locking mechanism to release the depth guide shaft from the locked position when the release switch is actuated, wherein the locking and release mechanism is mounted in a hand-held power tool handle and the depth guide shaft extends from the hand-held power tool handle.

3. The depth guide of claim 2 wherein the hand-held power tool handle is attachable to and detachable from a hand-held power tool.

4. The depth guide of claim 2 wherein the depth guide shaft extends perpendicularly from the depth guide base.

5. The depth guide of claim 2 comprising additionally means for biasing the depth guide shaft into an extended position when the depth guide shaft is released from the locked position.

6. The depth guide of claim 5 wherein the means for biasing the depth guide shaft into the extended position includes a spring coupled to the depth guide shaft.

7. The depth guide of claim 2 wherein the locking mechanism includes a mechanism for locking the depth guide shaft into a locked position by preventing movement of the depth guide shaft in an extending direction while allowing movement of the depth guide shaft in a retracting direction.

8. The depth guide of claim 7 wherein the locking mechanism includes a locking pin mounted in a slot formed at an angle to the depth guide shaft and positioned adjacent to a flattened portion of the depth guide shaft such that the locking pin is moved in the slot away from the flattened portion of the depth guide shaft when the depth guide shaft is moved in a retracting direction, to allow movement of the depth guide shaft in the retracting direction, and biased in the slot against the flattened portion of the depth guide shaft, to prevent movement of the depth guide shaft in the extending direction when the shaft is attempted to be moved in an extending direction.

9. The depth guide of claim 8 wherein the locking pin is mounted in a slot formed in a bushing mounted around the depth guide shaft.

10. The depth guide of claim 8 wherein the locking pin is biased against the flattened portion of the depth guide shaft in the slot by a locking pin spring coupled to the locking pin.

11. The depth guide of claim 10 comprising a linkage coupling the locking pin spring to the locking pin.

12. The depth guide of claim 8 wherein the release switch is mechanically coupled to the locking pin such that the locking pin is moved in the slot against the bias away from the flattened portion of the depth guide shaft in response to actuation of the release switch, to allow movement of the depth guide shaft in the extending direction.

13. The depth guide of claim 12 comprising a lever coupled to the release switch and a linkage coupling the lever to the locking pin, such that movement of the release switch moves the lever and the linkage to couple movement of the release switch to the locking pin.

14. The depth guide of claim 2 comprising additionally an adjustable depth adjustment mechanism to prevent movement of the depth adjustment shaft in a retracting direction beyond a selected amount.

15. The depth guide of claim 2 comprising additionally depth gradations marked on the depth guide shaft.

16. The depth guide of claim 1 wherein the depth guide shaft is mounted for sliding movement in the hand-held power tool handle, and comprising additionally a depth guide shaft locking mechanism mounted in the hand-held power tool handle and coupled to the depth guide shaft, whereby the depth guide shaft is lockable into a desired locked position.

17. The depth guide of claim 1 wherein the hand-held power tool handle is attachable to and detachable from a hand-held power tool.

18. The depth guide of claim 1 wherein the depth guide shaft extends perpendicularly from the depth guide base.

19. The depth guide of claim 16 comprising additionally depth gradations marked on the depth guide shaft.

20. The depth guide of claim 16 comprising additionally at least one bushing mounted in the hand-held power tool handle and around the depth guide shaft whereby the depth guide shaft is supported for sliding movement in the hand held power tool handle.

21. The depth guide of claim 16 wherein the depth guide shaft locking mechanism includes an automatic locking mechanism for automatically locking the depth guide shaft into a locked position when the depth guide shaft is moved into a desired position and a release switch coupled to the automatic locking mechanism to release the depth guide shaft from the locked position when the release switch is actuated.

22. The depth guide of claim 16 comprising additionally means for biasing the depth guide shaft into an extended position when the depth guide shaft is released from the locked position.

23. The depth guide of claim 22 wherein the means for biasing the depth guide shaft into the extended position includes a spring coupled to the depth guide shaft.

24. The depth guide of claim 16 comprising additionally a depth adjustment mechanism whereby movement of the depth guide shaft in a retracting direction beyond a selected amount is prevented.

25. The depth guide of claim 24 wherein the depth adjustment mechanism includes an adjustable depth adjustment screw mounted in the hand-held power tool handle and extending therefrom and a depth adjustment stop positioned to contact the depth adjustment screw when the depth guide shaft is moved in a retracting direction thereby to prevent movement of the depth guide shaft in a retracting direction beyond a selected amount.

26. The depth guide of claim 25 wherein the depth adjustment stop is moveably mounted around the depth guide shaft and extends radially therefrom such that a plurality of stop positions on the depth adjustment stop are individually moveable into alignment with the depth adjustment screw, and comprising additionally a height adjustment mechanism attached to the depth adjustment stop in at least one of the stop positions.

27. The depth guide of claim 26 wherein the height adjustment mechanism includes a screw threaded into an aperture formed in at least one of the stop positions.

* * * * *